INVENTORS:
Reginald John Fowler
Abraham William Groot
By Darbo, Robertson & Vandenburgh
Attorneys INVENTORS:
Reginald John Fowler
Abraham William Croot By Darbo Robertson & Vandenburgh
Attorneys 3,510,943
CUTTING DEVICE WITH SAFETY GUARD
Reginald John Fowler, 6 Compton Road, London N. 21, England, and Abraham William Croot, 50 Bramble Road, Hatfield, Hertfordshire, England
Filed Aug. 3, 1967, Ser. No. 658,273
Int. Cl. B26b 25/00, 29/00
U.S. Cl. 30—287      2 Claims

ABSTRACT OF THE DISCLOSURE

A shroud for a rotating cutter has a bearing about the spindle to orient the shroud with respect to the cutter. The shroud includes a fixed member having plates on both sides of the cutter, to one of which the bearing is affixed, and a movable member having plates on both sides of the cutter and spaced closer together than the plates on the fixed member so as to move between the plates of the fixed member. The movable member is pivotally connected to the fixed member at a point spaced to one side of the spindle and has an operating handle connected thereto by which the movable member may be moved from a position at which the cutter is enclosed to a position between the plates of the fixed member with a substantial portion of the cutter exposed. Spring means are operably connected to the movable member to resiliently urge it to the position at which the cutter is enclosed.

---

This invention relates to cutting devices wherein the cutters are provided with shrouds and more particularly but not exclusively, to hedge cutters.

The object of the invention is to provide improved safety arrangements on such cutters.

The main aspect of the invention is a rotary cutter with an articulated shroud, which normally shrouds the entire blade or blades, and which is manually operable against spring means to unshroud a cutting area of the blade or blades.

Figure 1:
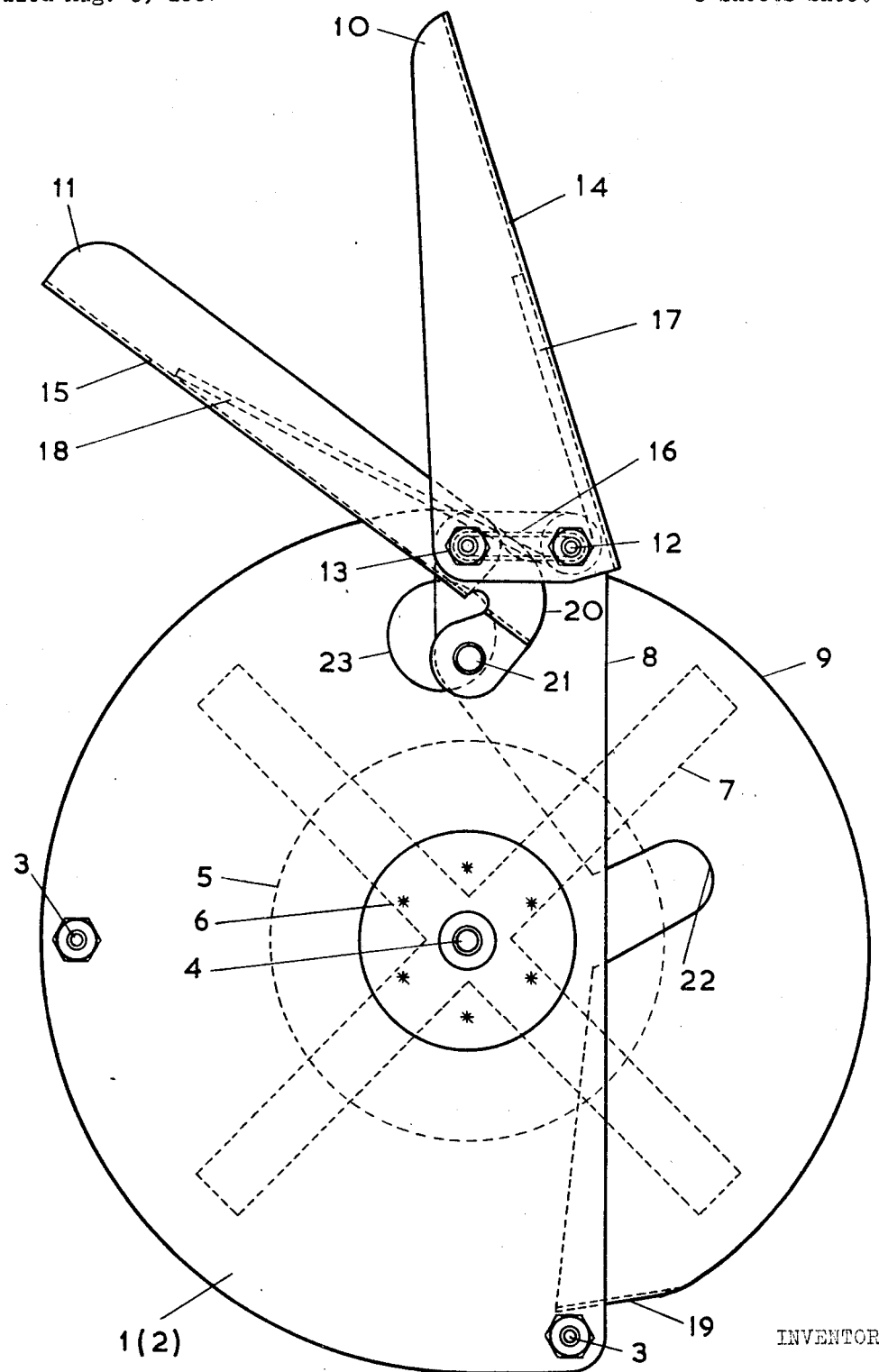
Figure 2:
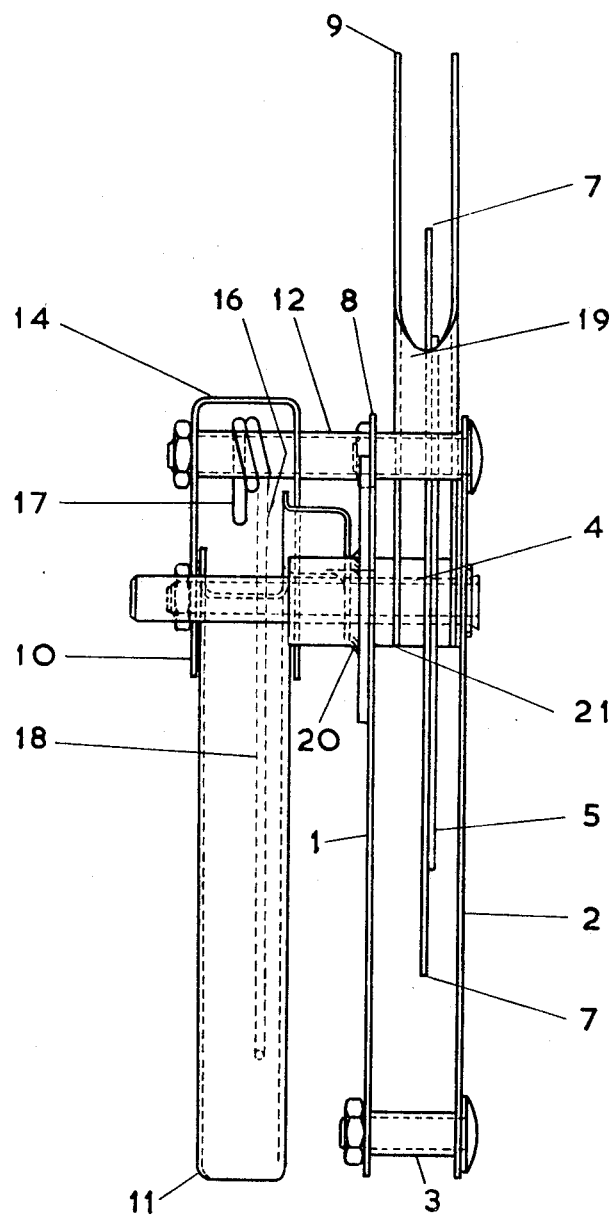
Figure 3:
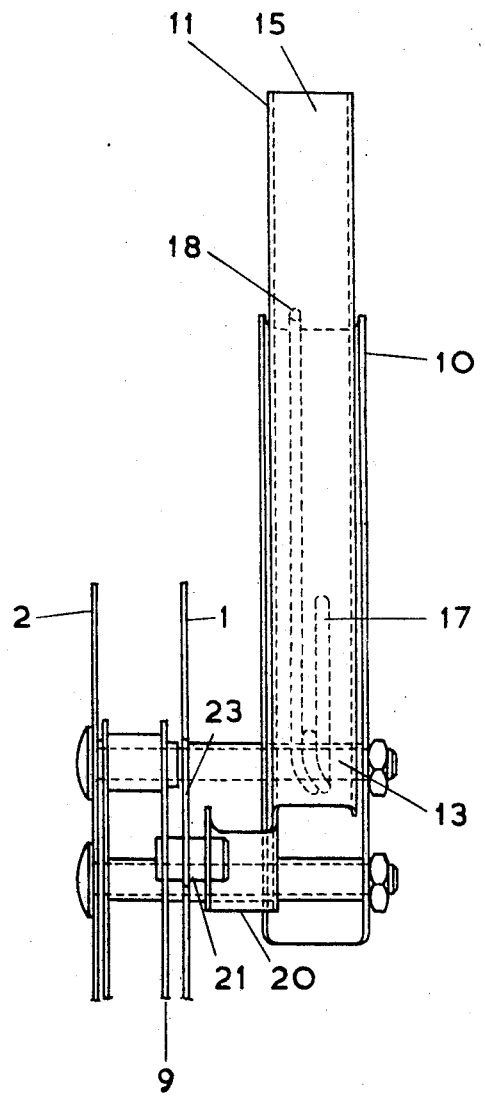

The invention will be described with reference to an embodiment shown in the accompanying drawings in which:

FIG. 1 is a plan view of the essential parts of a rotary multiblade hedge cutter embodying the invention, FIG. 2 is an end elevation of FIG. 1 from above, while FIG. 3 is an end view of FIG. 1 in the direction of the arrow A.

The main framework of the cutter, which also constitutes one part of the shroud, consists of two roughly semicircular spaced plates 1, 2, connected by spacing bolts 3. A cutter spindle 4 is rotatably journalled in a bush 24 between the plates 1, 2, and carries a cutter-supporting disc 5 on which is spot welded a cruciform set of four cutter blades 7. The bush 24 is carried by a disc 25 spot-welded at 6 to the top plate 1. The position of the spindle 4 in the plates 1, 2 is such that each cutter blade extends beyond the straight edges 8 of the plates 1, 2 for about 120° of rotation. The area of the rotational circle of the blades beyond the line 8 constitutes the cutting area in operation.

The spindle 4 extends beyond one of the plates 1, 2 and is connected to an electric motor (not shown), or other source of power, which is supported by, or supports, the cutter, and has a spring-loaded switch.

It is desired to shroud the operational area of the cutter when not being used for a cutting operation, and to require the use by the operator of both hands to unshroud and to operate the cutter in the interests of safety. This requirement is provided by a second movable part 9 of the shroud and a two-part handgrip 10, 11 for operating the movable shroud member 9, plus a manual power control.

The part 10 of the hand-grip is fixed to the plates 1, 2 by bolts 12, 13, and is a triangular channel member with its base 14 adjacent bolt 12. On bolt 13 is pivotally mounted the movable part 11 of the hand-grip, which is also of channel formation but is narrower than channel member 10 and has its base 15 remote from part 10. A wire spring 16 makes use of bolt 12 as its pivot point, and has legs 17, 18 extending along the channels 10, 11 respectively holding them apart. Thus to move channel member 11 into channel member 10 and hold it there, the two members must be spanned by the hand, gripped together, and held. When the hand pressure is removed, spring 16 will promptly force the members 10, 11 apart.

The movable shroud member 9 is made by bending a butterfly-shaped plate about the "body" portion 19 so that the "wings" are parallel and so spaced that their overall width is less than the width of the space between plates 1, 2 between which, therefore, the member 9 can move in a plane parallel to the plates 1, 2. The free ends of the wings are pivoted on bolt 13 and embrace and are rigidly connected to the outer end of a right-angle extension 20 of handgrip member 11 by a connector 21. Connector 21 passes through a hole 23 in the portion of framework plate 1 which extends between the extensions 20 and the movable shroud 9. The hole 23 allows movement of the connector 21 around pivot 13, so that handgrip member 11 and shroud member 9 form a rigid two-armed lever movable about pivot 13.

The shroud member 9 is slotted on an arc around pivot 13 having the same radius therefrom as cutter spindle 4, so that when the handgrip 10, 11 is compressed, the shroud member 9 is moved inwards between plates 1, 2 until it is wholly between the plates with the slot 22 providing clearance for the spindle 4.

The members 1, 2 and the member 9 respectively constitute two parts of an overall shroud, which parts because of their different widths can "jackknife" one into the other. The relative widths could of course be reversed.

The cutter could have a disc blade instead of the radial blades shown: any other desired rotary cutter arrangement could be used, designed for any purpose.

In order to provide work for the other hand, the electric switch or button for the motor drive is spring-loaded and requires constant operation during use of the cutter, ensuring that both hands are in use, one holding the handgrip and the other holding the starting switch.

The drive may be via a clutch from a constantly-operating source of power in which case the other hand will be used to operate the clutch instead of the power supply itself, which may be apetrol engine for example, instead of an electric motor.

The switch or clutch lever can be mounted on and form part of a second handgrip mounted on the casing.

In an alternative embodiment, the shroud may comprise cooperating parts of two coaxial two-armed levers, the other parts of which constitute a hand-grip closure of which opens the movbale shroud members by a reverse scissors movement, the "blades" opening as the "handles" are closed. Such levers could be pivoted in a similar position to that used in the drawings, or coaxially with the cutter rotor.

The two movable shroud members could constitute the complete shroud or cooperate with a fixed shroud member. The latter arrangement would be facilitated by having a second fixed handle with the switch or clutch lever thereon.

A movable part or parts of the shroud could have arcuate or linear movement, for example, by providing a suitable linkage to the shroud-operating hand-grip.

The invention can be applied to cutting devices in which the blade movements are other than rotary.

What we claim is:

1. In a rotary cutter having a cutting device attached to a spindle and rotatable therewith whereby the device describes a cutting circle in a plane, and shroud means for said device, which means includes a manually operable handle, the improvement in said shroud means including:
   a fixed shroud member;
   support means for said spindle secured to fixed member and maintaining said spindle and member in a given orientation with respect to each other;
   a movable shroud member;
   said members each having portions at both sides of said plane and being open in the portion of the plane described by said circle for the passage of said cutting device, one of said members being of a size, and positioned, to interleave with the other of the members;
   pivot means interconnecting the members along an axis parallel to and spaced from said spindle for supporting the movable member for movement parallel to said plane in scissors fashion between a first position at the two members forming an enclosure about said circle and a second position at which the members are interleaved and said portions fitting about the spindle with a substantial part of said circle exposed; said handle being connected to said movable member for moving said movable member from said first to said second position; and
   spring means operably associated with said movable member for resiliently urging said movable member toward said first position.

2. In a rotary cutter as set forth in claim 1, wherein said portions comprise two spaced plates on each of the members, said plates on said one of said members being closer together than the plates of the other member so as to pass between the plates of the other member and interleave therewith.

References Cited

UNITED STATES PATENTS

| | | | |
|---|---|---|---|
| 2,091,827 | 8/1937 | Mercatoris | 30—276 |
| 2,342,052 | 2/1944 | Jimerson | 143—159.6 |
| 2,987,084 | 6/1961 | Mandell | 143—159.6 X |
| 3,115,910 | 12/1963 | Steiner | 143—43 |

ROBERT C. RIORDON, Primary Examiner

J. C. Peters, Assistant Examiner

U.S. Cl. X.R.

143—159